Figure 10:
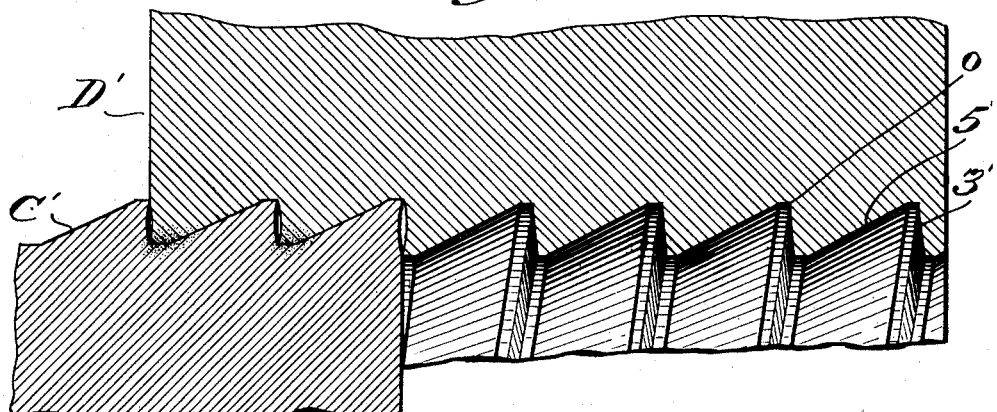

F. H. RICHARDS & W. D. ZEHNDER.
RAIL JOINT.
APPLICATION FILED APR. 9, 1903.
909,118.
Patented Jan. 5, 1909.
4 SHEETS—SHEET 1.
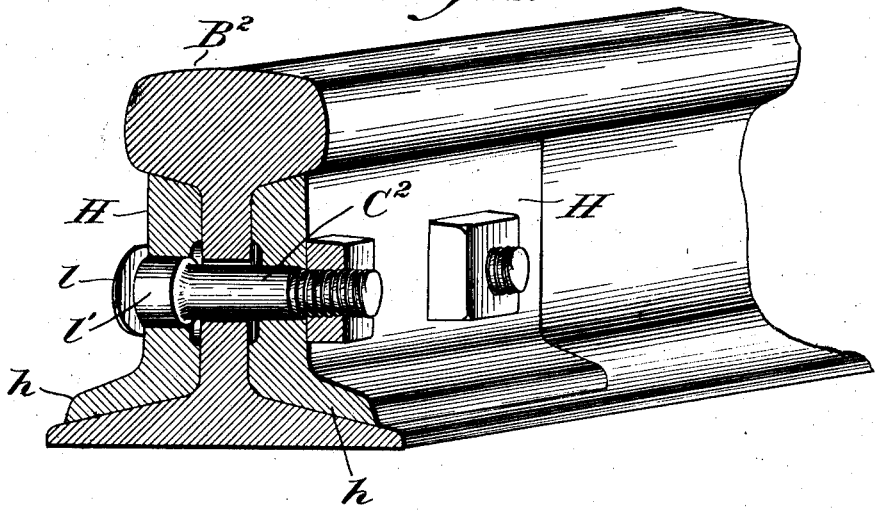
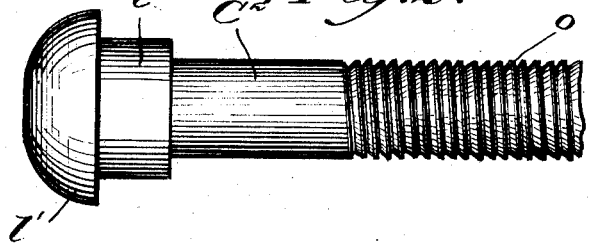
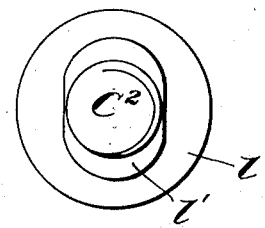
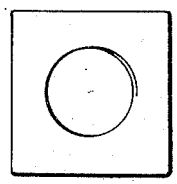
Witnesses:
R. Lancaster
H. C. Abbott
Inventors:
Wm. D. Zehnder,
Francis H. Richards,
By their Attorney,
F. H. Richards.

F. H. RICHARDS & W. D. ZEHNDER.
RAIL JOINT.
APPLICATION FILED APR. 9, 1903.
909,118.
Patented Jan. 5, 1909.
4 SHEETS—SHEET 2.
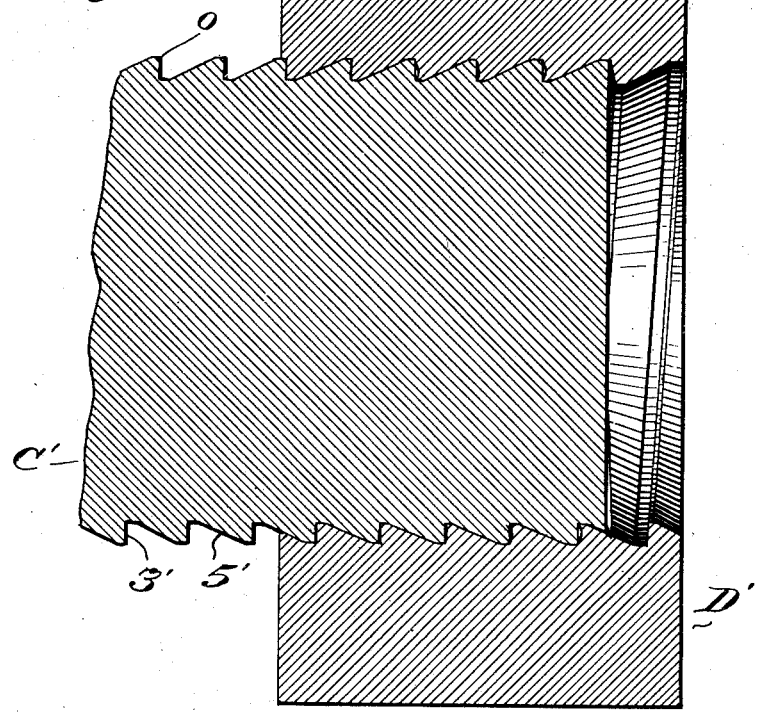
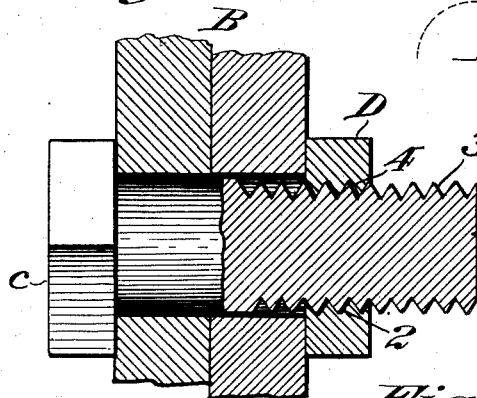
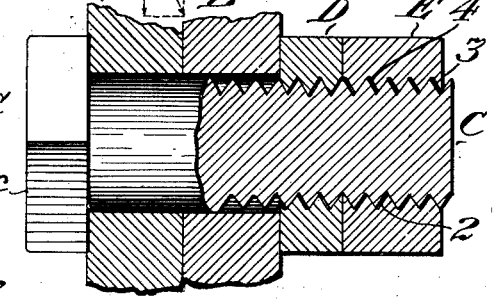
Witnesses:
R. Lancaster
H. C. Abbott
Inventors:
Wm. D. Zehnder,
Francis H. Richards,
By their Attorney,
F. H. Richards.

F. H. RICHARDS & W. D. ZEHNDER.
RAIL JOINT.
APPLICATION FILED APR. 9, 1903.

909,118.

Patented Jan. 5, 1909.

4 SHEETS—SHEET 3.

Witnesses:
R. Lancaster
H. C. Abbott

Inventors;
Wm. D. Zehnder,
Francis H. Richards,
By their Attorney, F. H. Richards.

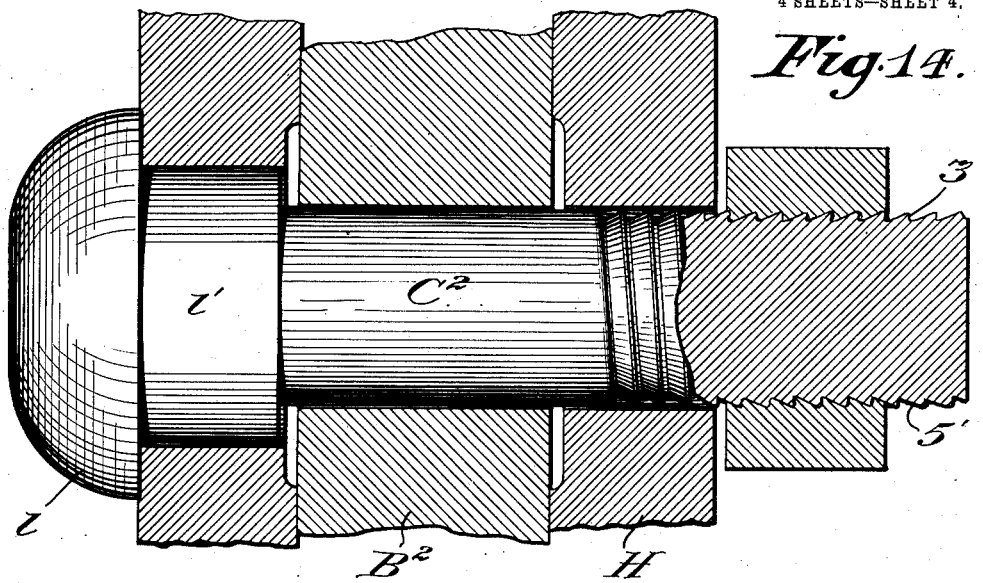
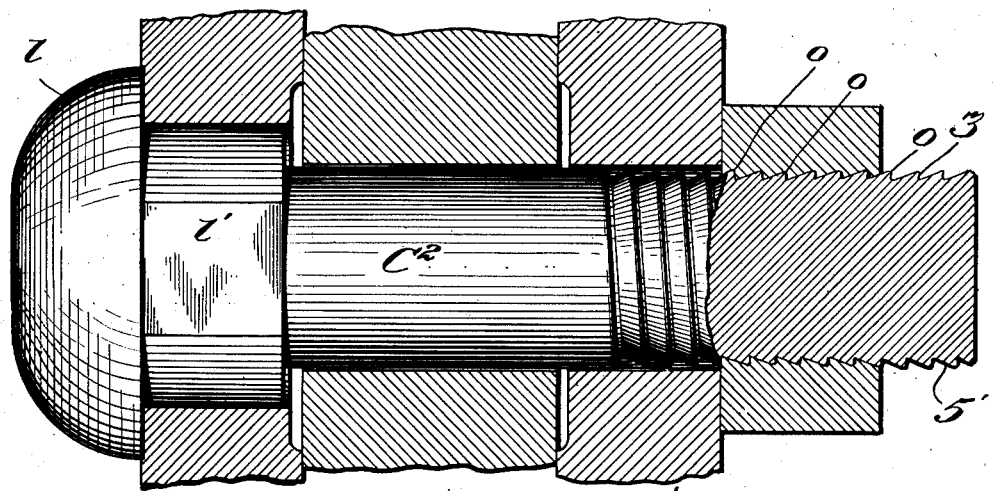

UNITED STATES PATENT OFFICE.

FRANCIS H. RICHARDS, OF HARTFORD, CONNECTICUT, AND WILLIAM D. ZEHNDER, OF SCRANTON, PENNSYLVANIA.

RAIL-JOINT.

No. 909,118.  Specification of Letters Patent.  Patented Jan. 5, 1909.

Application filed April 9, 1903. Serial No. 151,733.

*To all whom it may concern:*

Be it known that we, FRANCIS H. RICHARDS, a citizen of the United States, residing at Hartford, in the county of Hartford and State of Connecticut, and WILLIAM D. ZEHNDER, a citizen of the United States, residing at Scranton, in the county of Lackawanna and State of Pennsylvania, have invented certain new and useful Improvements in Rail-Joints, of which the following is a specification.

This invention pertains to means for securing together the contiguous ends of parts such as rails, and it relates especially to that class of railway joints in which one or more, ordinarily two, side or fish plates are bolted or clamped together against the opposite sides and at the abutting ends of consecutive rails.

The present improvements are closely related to the subject-matter disclosed in our pending application Serial No. 127,477, filed October 16, 1902, and entitled "Fastening and locking device", and comprises ordinarily in combination with other members, a plurality of bolts each combined with a corresponding nut the cross-section of whose thread or threads is so designed as to create when the nut is in a clamping position on the bolt actions and reactions analogous to a very large extent to those existing in the ordinary lock nut device, and which when the latter device is properly constructed and used are closely connected with its efficient and satisfactory operation. To this end the clamping bolt or bolts of the present joint and the nuts engaged therewith are provided with such a form of thread as is best calculated to produce in the metal of the bolt and the nut, strains and stresses like in kind to those existing in a holding nut and its coöperating check nut, considered as a whole. Combined with such holding bolts also, is a side or fish plate on each side of the rails at the joint, which plates when forced together by the tightening of the nuts upon the respective bolts serve to bring the rail ends into as close alinement as may be.

With respect to the form of thread capable of producing results hereinbefore adverted to, we have adopted such a configuration of thread as is disclosed in our application hereinbefore referred to, in which the thread surface, although extending spirally from end to end of the threaded section of the bolt, is yet, nevertheless, inclined to the axis of the latter constituting a surface acting like a wedge with reference to the contacting surface of the encircling nut.

As a further structural feature of the bolt and nut utilized in the present joint, although it is to be distinctly understood that such feature may not under all circumstances be incorporated, the pitch of the thread within the nut may differ (although but slightly) from the pitch of the thread on the bolt, the best results being obtained by making the pitch of the thread of the nut slightly greater than that of the thread on the bolt. In the event that such a difference of pitch shall exist between the bolt and its nut there is further provided on the former a surface which, although likewise extending spirally along the bolt, is more nearly normal to the axis thereof. The function which it is intended to perform is in the nature of an abutment or stop face for producing the reaction involved in the fulfillment by said inclined face of its proper function.

The drawings which accompany the present specification illustrate a rail joint comprising side or fish plates adapted to overlap and be clamped against the sides of the abutting ends of the rails by bolts and nuts in whose construction there are embodied the features hereinbefore referred to, and these drawings set forth, furthermore, the principle or method in accordance with which the two parts of the fastening device comprising a bolt and nut, coöperate with each other to produce conditions analogous to those prevailing in a three-part, or ordinary check or lock-nut fastening device.

Figure 11:
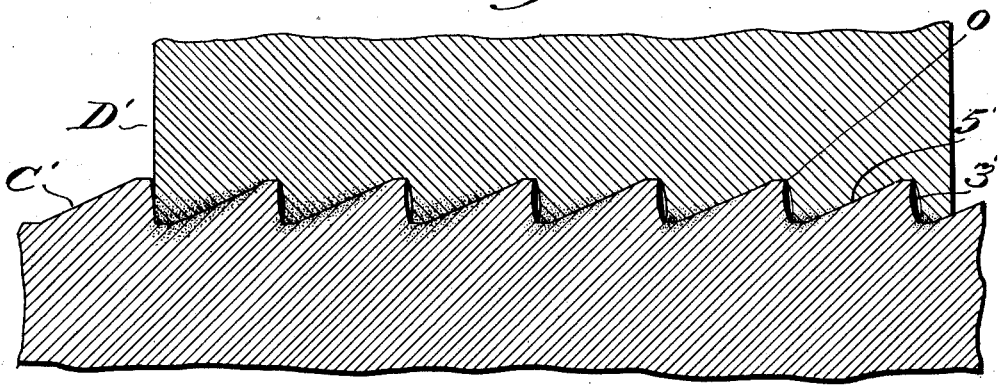
Figure 12:
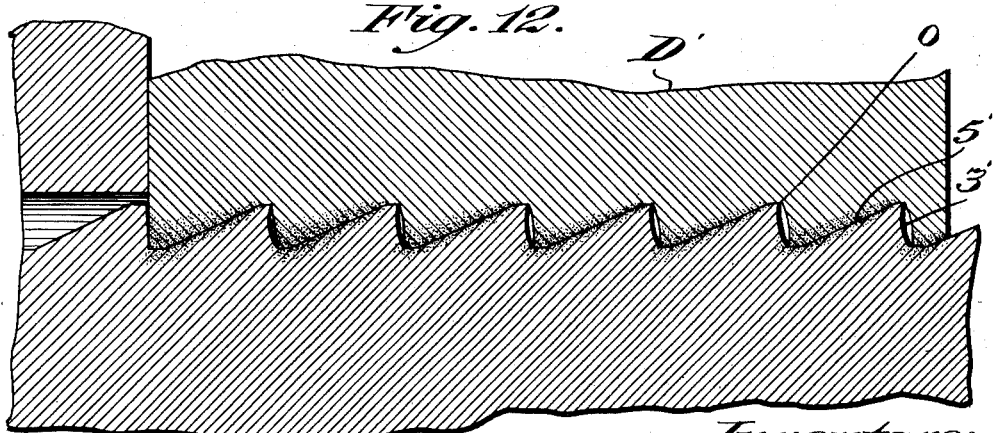

In these drawings, Figure 1 is a cross-sectional perspective view, the plane of the section being somewhat removed from the plane of the abutting surfaces of the rail ends and corresponding to the cross-sectional plane which passes through one of the bolt holes in the web of the rail. Fig. 2 is an elevation, upon a somewhat larger scale, of the bolt indicated in Fig. 1. Fig. 3 is an end view of such bolt. Fig. 4 is a similar view of a nut adapted to engage with the threaded section of the bolt of Fig. 2. Fig. 5 is an axial section of such nut. Fig. 6 is a view mainly in longitudinal section of a conventional form of bolt with which there is engaged an ordinary holding nut which is assumed to be firmly clamped against the parts held, the existing separation of some of the opposed surfaces being to an extent exaggerated the more clearly to illustrate the function and relation of various surfaces. Fig. 7 is a view similar to Fig. 6, illustrating combined with the various parts set forth in the latter figure, the additional feature of a check nut which is assumed to have been screwed sufficiently tight against the holding nut to enable it to perform its intended purpose. Fig. 8 is a diagrammatic view of an ordinary V-thread with which fastening bolts are usually provided. Fig. 9 is a longitudinal section of the threaded portion of the improved bolt and also of its nut, the latter being illustrated in a position in which it has been screwed part way on the bolt, and the figure being drawn on a much enlarged scale. Fig. 10 is a view similar to Fig. 9, only a portion of the bolt and the engaged nut being indicated, while the thread of the two is drawn on a considerably larger scale. Figs. 11 and 12 are views similar to Fig. 10, Fig. 11 showing the parts in a position in which the nut has been just brought into contact with the face of one of the parts (the work), against which the nut is eventually clamped, and Fig. 12 illustrating the parts after a considerable pressure has been exerted upon the nut to screw it home to its final position. Fig. 13 sets forth force or pressure diagrams of the pressure normal to the inclined face of the thread and also the pressure exerted by the encircling end normal to the axis of the bolt, the two parallelograms illustrating the compositions of forces (with a given backward thrust of the nut) for both the ordinary bolt thread and the thread adapted for use in the present clamping bolts. Fig. 14 is a sectional view illustrating the bolt comprising one of the features of the present joint, and with the threaded portion of which there engages a properly formed nut, this latter being shown in the position just before it is brought into engagement with the face of the work in tightening up the device; and Fig. 15 is a view similar to Fig. 14 but indicates the slight deformation of the thread from the nut being screwed home.

Similar characters of reference designate corresponding parts in all figures.

In order to lead to a full understanding of the mode of operation involved in the use of the bolt element of the present joint, the ordinary check or lock nut is set forth in a conventional way, see Fig. 7, to which reference may be made, as also to Fig. 6, in which the holding nut only is assumed to be forced down upon the face of the work preparatory to the engagement of the outer or locking nut with the thread of the bolt. For the purpose of reference the work in these two figures is designated in a general way by B, while the bolt is similarly designated by C and the holding nut by D. When the nut upon screwing the same down on the bolt comes into engagement with the face of the work and is thereupon forcibly turned around to bring the shoulder-forming head c of the bolt into firm engagement with the work (the inner face of the nut simultaneously pressing more and more firmly against the opposite face thereof) the tendency of the reaction manifesting itself as a backward thrust of the nut is to force the same more and more firmly against that spiral face of the thread on the bolt which faces forwardly, that is which faces toward the surface of the work against which the nut bears and simultaneously with this backward thrust to relieve the rearwardly facing spiral surface of the thread on the bolt from pressure. The release of this latter face from the pressure of the nut is indicated by the separation of the surfaces, this separation being somewhat exaggerated to more clearly illustrate the action taking place, see the spaces 2 between the rearwardly-facing spiral face 3 of the bolt and the opposite spiral face 4 of the nut. When the nut has been forced down firmly against the work this relief of the rearwardly-facing surface of the bolt will have been occasioned to an appreciable amount. Such are the conditions prevailing when the holding nut is forced down upon the work and before the outer or lock-nut is brought into play.

Referring to Fig. 7, in which the outer or lock-nut E is assumed to have been screwed down tightly against the holding nut D, it is evident that there will arise as the check nut is screwed home, a tendency from the compression applied by the outer nut, supplemented by the elongation of the bolt, to relieve the forwardly-facing spiral surface of the thread of the bolt from the pressure of the inner or holding nut and to transfer such pressure to the opposite or rearwardly-facing surface of the bolt thread; such in fact will ordinarily be the result, the outer or check nut then approximating to the condition of the inner or holding nut before the former has been applied. The condition of the two nuts under these circumstances is indicated in Fig. 7, in which the pressure-subjected surface of the thread within the outer or check nut faces in the same direction as the pressure-subjected surface of the thread of the holding nut in Fig. 6, while the pressure on the thread within the bore of the inner or holding nut of Fig. 7 is against the oppositely-inclined surface. The directions of the action and reaction called into play by the mutual clamping of the inner and outer nuts are indicated by the arrows adjacent to those parts in Fig. 7.

Referring again to Fig. 6, it is evident that the entire length of the bolt from the shoulder-forming head c thereof to the center of effort exerted by the nut is under tension, while as compared with this comparatively great length under tension, when the check nut is screwed against the inner nut, only that length of the bolt is under a tensile stress which lies between the centers of effort acting in opposite directions of the two nuts. It is therefore evident that the holding nut and the check nut considered as an integral structure, or as a whole, create within a length bounded by the outer face of the outer nut and the inner face of the inner nut action and reaction of a tensile nature longitudinally of the axis of the bolt which puts that portion of the bolt under a tension which is maintained by the pressure between the contiguous faces of the two nuts. This mutual pressure resists the turning of either nut upon the bolt; this resistance to turning is further augmented by the friction of the inner face of the inner nut against the face of the work against which it is forced, not only initially when screwed home on the bolt but also by the pressure exerted thereagainst by the outer or check nut. It is true that the portion of the bolt between the shoulder-forming head $c$ and the inner nut is also under tension by reason of the screwing down of the latter, but the stress to which this portion is subjected is independent of and additive to the tension existing in the bolt between the two nuts, as aforesaid.

The same conditions are established in each bolt comprised in the present joint by means of a single nut as compared with two, which single nut upon being engaged with the thread of the bolt may thereupon be turned down against the face of the work, the resultant conditions of stress and strain, action and reaction being brought about by a peculiar conformation of the engaging threads.

With regard to the particular species of thread adopted by us, it will comprise a spiral surface which is inclined to the axis of the bolt and a spiral surface which is preferably substantially normal to such axis, as fully set forth in our hereinbefore referred to application. In the nut and bolt construction illustrated the bolt is designated in a general way by C', and the nut is similarly designated by D'; the inclined surface of the thread of the bolt is designated by 5' and the vertical surface of the thread by 3'. It will be noted that such inclined surface is a forwardly-facing one, that is it faces toward the shoulder-forming head of the bolt, while the vertical portion of the thread faces in the opposite direction. It is this inclined portion or surface of the thread that constitutes the friction surface against which the corresponding portion of the thread in the nut presses and by reason of the consequent frictional resistance to the turning of the nut, aids in preventing the latter from loosening.

In bolts provided with the ordinary V-thread, one-eighth of the pitch of the thread is oftentimes turned off at the top of the thread, while another eighth of the pitch is filled in at the bottom of the thread, thus leaving but six-eighths of the pitch devoted to the inclined surfaces of the thread. When the nut is under the pressure of the reaction exerted by the work or if a check nut be used with the holding nut, but one-half of this six-eighths, or three-eighths is effective as a friction surface. As compared with such a proportion it is contemplated in the practical use of the bolts herein described that a form of thread shall be employed for the threaded portions of the connected parts such that a greater fraction of the pitch of the thread shall be appropriated to the friction-exerting, nut-holding surface. In some cases it may be possible to make such fraction at least five-eighths of the pitch, that is five-eighths of the entire inclosed bolt area. Moreover, assuming that a given reaction is exerted by the work tending to press the nut outward toward the end of the bolt, a greater pressure is exerted upon the inclined surface of the thread of the bolt of the present joint as compared with the inclined surface of the usual form of V-thread. This is illustrated in the two diagrams of Fig. 13, in which the line $x$ represents the relative inclination of the surface of the V-thread, $x'$ the corresponding surface of the present thread, and the lines $y$, $y'$, respectively, the reaction (assumed to be equal in amount) exerted by the work through the nut against the inclined surfaces of the bolt thread. In the two cases, the inward compression normal to the axis of the bolt arising from the resistance to expansion exerted by the nut is indicated by $z$, $z'$, respectively. Completing the parallelograms of forces or stresses, it is plain that the length of the diagonal $r$ representing the pressure normal to the surface of the V-thread is considerably less than the length of the diagonal $r'$ representing the corresponding pressure normal to the surface of the present thread; that is to say, for a given clamping force against the work a pressure of comparatively greater amount is exerted upon the inclined surface of the present thread as compared with that to which the inclined surface of the V-thread is subjected; hence the frictional resistance to turning due to the friction of the inclined surfaces is much greater in the present instance than with the V form of thread. It should be mentioned, however, that for a given depth of thread this pressure is exerted over a larger area of surface in the present thread than in the V form, a fact evident from the greater length of the line $x'$ compared with the line $x$. Such being the construction, when the nut formed with a thread of relatively great inclination is screwed up against the surface of the work, the backward thrust tends to force the spirally-disposed inclined surface on the nut upward upon the inclined surface of the bolt, increasing the pressure between these contacting surfaces and thus tending to increase the frictional resistance to turning.

Having thus described the bolt and nut feature of the present fastening device for securing the abutting ends of consecutive rails, the other elements associated therewith will be referred to. One of the rails to whose end portion the device is clamped is indicated in the drawing and designated in a general way by $B^2$. The form of rail illustrated is that commonly employed for railway tracks at the present day. Upon opposite sides of the rail and overlapping the joint between consecutive rails are side or fish plates H, H, each adapted to bear against the web of the rail and having, in the usual form of such fish plates, the bottom laterally-projecting flange $h$. The web of the rail is provided with suitable openings for the passage of the bolt $C^2$, any desired proper number of the same being used at each rail end. These bolts are of sufficient length to provide projecting ends when thrust through the openings in the rail web for the nuts to be engaged with them and screwed up on the bolts to clamp the fish plates securely in place.

Each bolt having a head $l$ is indicated as also having a portion $l'$ in the nature of an elongated hub or boss which fits into a non-circular opening in one of the fish plates, thus preventing the bolt from turning when the nut is screwed up to clamp the parts together.

Although not considered essential in every instance, a further feature may characterize the construction of the bolt and nut used, and as hereinbefore described, such feature relates to the comparative pitches of the thread on the bolt and the thread on the nut. The pitches of the two threads may differ from each other, although to a very slight extent, that of the nut thread being ordinarily made greater than that of the bolt thread, this difference however, being within such limits as do not prevent the nut from being run up on the bolt upon the application of reasonable force. The direct effect of this difference in pitch between the engaged parts is to force the inclined surface of consecutive convolutions of the thread within the nut up onto the inclined surface of the thread on the bolt, progressively more and more from the front or work-contacting face of the nut towards the opposite or rear face thereof. The reaction which causes the nut threads to ascend, as it were, the inclined thread surface of the bolt is taken by that portion of the vertical surface of the thread on the bolt adjacent to the corresponding surface at the front end of the nut and which contacts therewith. This contact will only occur adjacent to the front portion of the nut, since by reason of the discrepancy between the two pitches the vertical portion of the thread on the nut will gradually more and more separate from the vertical portion of the thread on the bolt as more and more of the convolutions intervene between the front portion of the nut and portions toward its rear face; thus greater and greater pressure between the inclined surfaces is progressively exerted.

From the foregoing description it will be apparent that the conditions prevailing and reactions subsisting in a nut and bolt so formed, when the former has been fully run up on the bolt, are entirely analogous to the reactions, etc., existing in a bolt having holding and check nuts engaged with the thread thereof. Thus at the front portion of the nut the pressure is forwardly against the rearwardly-facing (vertical) surface of the nut thread, as in the holding nut of Fig. 7, while adjacent to the rear portion of the nut the pressure is exerted against the opposite or inclined face of the thread, as in Fig. 7, in which the pressure is exerted against the similarly facing surfaces of the lock or check nut thread. Indeed the absolute pitches of the threads and the difference in such pitches may be such as to produce actions and reactions between the surfaces, and stresses and strains in the material of the nut and bolt, not only like in kind but substantially equivalent in amount to those created in the holding and locking device of Fig. 7, even before the nut embraced in the present joint shall have been brought up into contact with the face of the work. It should also be stated, in further explanation, that the nut is subjected to a compressive strain when the parts are engaged like the nuts D, E, of Fig. 7, while the metal of the bolts in both instances is subjected to tensile strain.

While the cross-sectional form of the respective threads of the bolt and nut may be as illustrated, that is substantially alike, they may on their outer end be made to differ slightly from each other.

The stresses to which the metal is subjected of course have a tendency to modify the actions inherent in the formation and relation of the parts and especially to increase the length (longitudinally of the bolt) of the area over which contact exists between the opposed inclined surfaces, a lengthening which increases in proportion to the force required to turn the nut up on the bolt. In fact, such tendency will increase to an extent, especially under heavy work, as to ultimately bring the entire portion of the surfaces into bearing engagement.

In practice, of course, and especially under heavy duty the peculiar phenomena are accompanied by the shifting of various portions of the two masses of metal. This of course refers to the threads more than to the body portion of the bolt and nut. This is true particularly of those portions of the thread of the nut and of the bolt adjacent to the angles *o* which may under a high pressure flow into the spaces adjacent to the vertical portion of the thread more or less approximately filling the same and modifying therefore the cross-sectional contour of the thread.

Since the wedge thread used in the present construction is somewhat shallower when of the same pitch than ordinary threads, the diameter of the bolt at the base of the thread is considerably larger for the same nominal size of bolt. This tends to give a greater strength in the bolt and would call for a longer threaded portion and also for a longer nut to match the increased strength of the bolt itself. Of course the longer the bolt and nut of a given diameter the less difference in pitch will be required between their threads.

Having thus described my invention, I claim:

1. In a rail joint, the combination of side plates adapted to be clamped to the sides of the rail ends, and a two-part fastening device one of whose parts has an abutment at one end for engaging one of said plates, and a spirally disposed surface at the other end facing said abutment and inclined to the line of thrust and an oppositely-facing spirally disposed reaction surface of relatively less inclination to said line of thrust, and the other of whose parts constitutes an abutment for engaging the other of said plates and is provided with a pair of spirally disposed pressure-exerting surfaces corresponding and opposed to said reaction surfaces when the two parts of the device are interengaged, the reaction surface of the lesser inclination being of relatively greater width than the corresponding pressure-exerting surface whereby the said other part presses in axially opposite directions on the first mentioned part during engagement therewith.

2. In a rail joint, the combination of side plates adapted to be clamped to the sides of the rail ends, and a bolt having a head at one end, and at the other end a thread having the side facing the head inclined to the line of thrust and an oppositely-facing reaction surface of relatively less inclination to said line, and a nut provided with a corresponding thread of greater pitch, the difference in pitch between the engaged parts being effective to force the inclined surface of consecutive convolutions of the thread within the nut up on the inclined surface of the thread on the bolt, progressively more and more from the work-contacting face of the nut towards the opposite face thereof.

3. A two part fastening device one of whose parts has an abutment at one end for engaging one side of the part to be fastened and a spirally disposed surface at the other end facing said abutment and inclined to the line of thrust and an oppositely-facing spirally disposed reaction surface of relatively less inclination to said line of thrust, and the other of whose parts constitutes an abutment for engaging the other side of said part and is provided with a pair of spirally disposed pressure-exerting surfaces corresponding and opposed to said reaction surfaces when the two parts of the device are interengaged, the reaction surface of the lesser inclination being of relatively greater width than the corresponding pressure - exerting surface whereby the said other part presses in axially opposite directions on the first mentioned part during engagement therewith.

4. A bolt having a head at one end, and at the other end a thread having the side facing the head inclined to the line of thrust, and an oppositely facing reaction surface of relatively less inclination to said line, and a nut provided with a corresponding thread of greater pitch, the difference in pitch between the engaged parts being effective to force the inclined surface of consecutive convolutions of the thread within the nut up on the inclined surface of the thread on the bolt, progressively more and more from the work-contacting face of the nut towards the opposite face thereof.

Signed at New York, N. Y., (Nos. 9–15 Murray St.,) this 2nd day of April 1903.

FRANCIS H. RICHARDS.
WILLIAM D. ZEHNDER.

Witnesses:
FRED. J. DOLE,
JOHN O. SEIFERT.